United States Patent Office 3,395,070
Patented July 30, 1968

3,395,070
PAPER PRODUCT CONTAINING CELLULOSE GRAFT POLYMERS
James W. Adams, Schofield, and Henry W. Hoftiezer, Rothschild, Wis., assignors to Tee-Pak, Inc., Chicago, Ill., a corporation of Illinois
No Drawing. Original application Sept. 24, 1962, Ser. No. 225,881, now Patent No. 3,194,727, dated July 13, 1965. Divided and this application Dec. 3, 1964, Ser. No. 415,806
The portion of the term of the patent subsequent to July 13, 1982, has been disclaimed
1 Claim. (Cl. 162—146)

This application is a division of our copending application Ser. No. 225,881, filed Sept. 24, 1962 now Patent No. 3,194,727.

This invention relates to new and useful improvements in process for preparing polymer modified cellulosic fibers and to the products produced in accordance with said process.

The deposition of polymers into cellulosic materials has been reported in the prior art. Landells and Whewell, Journal of the Society of Dyers and Colorists, vol. 67, September 1951, described a process in which viscose rayon is treated with a solution of a catalyst under conditions which would cause the catalyst to become physically adsorbed therein, followed by treatment of the rayon with a aqueous solution of an olefinically unsaturated monomer. In that proces a considerable amount of polymerization takes place in the aqueous medium (as evidenced by extensive formation of latex), but a substantial amount of polymer is formed within the rayon host material. In Douglas J. Bridgeford, U.S. Patent 3,083,118; and the copending patent application of Douglas J. Bridgeford, Ser. No. 718,996, filed Mar. 4, 1958, processes are described in which a host material having ion-exchange functional groups is treated with a solution containing an ion which constitutes at least part of a catalyst system for polymerization of an olefinically unsaturated monomer. The ion in solution is chemically combined with the host material by ion-exchange reaction. The host material with the catalyst chemically fixed therein is then treated with an olefinically unsaturated monomer (either alone or in solution) and any remaining part of the catalyst system with the result that the olefin is polymerized within the host material. The Bridgeford process also covers the chemical fixation by an ion- exchange reaction of a material which is not inherently catalytic but which is converted into a catalyst by subsequent chemical reaction, e.g. by change of valence state or by conversion to a chemically free element, etc. In the Bridgeford patent applications, numerous examples are given of catalyst systems which are operative, and monomers are disclosed which can be used in the deposition of polymers within any of a large variety of host materials.

Summary of the Invention

This invention is based upon our discovery of a novel process for the preparation of composite polymeric materials. In particular, this process involves the treatment of cellulosic materials having ion-exchange capacity resulting from ionizable functional groups to chemically fix a material by an ion-exchange reaction. The material fixed by ion-exchange is adapted to constitute at least part of a catalyst for polymerization of an olefinically unsaturated monomer. The material which is chemically fixed by ion-exchange reaction may be an ion which is catalytically active per se or which is subsequently chemically modified to become catalytically active. The cellulosic material with the catalyst chemically fixed therein is contacted with an olefinically unsaturated monomer containing hydrolyzable functional groups and with any remaining part of the catalyst required to polymerize the monomer. This treatment is effective to cause the monomer to polymerize and become deposited in the cellulosic material. After polymerization of the monomer is complete, the composite product is subjected to hydrolysis using an aqueous base under conditions which are operable to hydrolyze at least part of the hydrolyzable functional groups in the composite product. In some cases, it is desirable to further modify the hydrolyzed functional groups by treatment with acid to convert said functional groups to the carboxyl or hydroxy form.

Products which are produced in accordance with this process are useful for a large variety of purposes. The partially hydrolyzed, polymer-containing cellulosic materials produced in accordance with this invention are especially useful in admixture with paper pulp for the production of paper having increased wet and dry strength as well as increased bursting and tear strength. The use of partially hydrolyzed, polymer-containing cellulosic fibers is especially desirable in the formation of paper from hardwood pulps which normally produce papers of very poor strength. When these products are used in admixture with paper pulp, a greater improvement of paper strength is obtained by acidification of a mixture of the paper pulp component and the polymer-containing component than is achieved by acidification of the components separately. The polymer-containing cellulosic materials can also be used in a dyed or colored form as a color carrier for producing unique color effects in paper. It has also been found that the polymer-containing cellulosic materials are useful as a soil conditioner to prevent clay soils from puddling when wet or caking when dry. When these products are mixed with urea and phosphoric acid, a product is obtained which is useful as a combination soil conditioner and fertilizer.

Host materials treated in accordance with the method of this invention

The method of this invention is applicable generally to the formation of partially-hydrolyzed deposited polymers in cellulosic materials of various types. The method is primarily useful in the treatment of fibrous cellulosic materials, such as cotton fibers, wood fibers, and derivatives thereof.

The material treated by the process of this invention may be in any of several forms. The material is preferably in the form of a fibrous naturally occurring cellulosic material. The material may be, for example, in the form of pieces of solid wood, or may be wood fibers, wood powder, or wood flour. Wood fibers used with this process may be in the form of mechanical pulp, which has been subjected to no preliminary chemical purification, but may also be used in the form of chemical pulp, including sulfate pulp, sulfite pulp, soda pulp, ground wood, peroxide pulp, sodium chlorite pulp, chlorine dioxide pulp, and pulp comprised of cellulose fibers from which substantially all the lignin has been removed. Similarly, other naturally occurring cellulosic materials can be used such as cotton fibers, either with or without preliminary chemical or physical treatment.

Whatever type cellulosic materials are employed as the host material, the fibers may be treated in either a slurry or web form. The process of this invention is also useful with webs or sheets formed of cellulosic fibers between which hydration bonds exist, such as, for example, various types of paper and paper products.

In other words, the process of the present invention can be used to treat any cellulosic material, such as cotton or wood fibers or cellulosic derivatives thereof, so long as the material is capable of undergoing ion-exchange reactions.

Chemical fixation of catalyst

In the process of this invention, the cellulosic material, such as wood fibers, preferably in the form of an aqueous slurry, is contacted with a solution of a material adapted to constitute at least part of a catalyst for effecting polymerization of an olefinically unsaturated monomer. The material in solution is capable of ion-exchange with chemical groups in the cellulosic material being treated. The ion-exchange involved ordinarily is cation exchange with the hydrogen or cation associated with the carboxyl groups of the cellulosic material. Of course, it is possible to chemically modify a cellulosic material to provide anion exchange sites for chemically fixing a catalyst anion therein. In most cases, the material used to treat the cellulosic host is an ionizable compound which yields ions which are chemically combined with the cellulosic host by ion-exchange reaction. Generally, the ions which are chemically fixed in this manner are catalytically active either alone or as part of a catalyst system. In some cases, however, the ion which is chemically fixed is not catalytically active but is subsequently modified by chemical treatment to a catalytically active form. Ionizable materials which form part of a catalytically active redox system or which are catalytically active, per se, and which can be chemically fixed by ion-exchange reaction are examples of the former type of material. Illustrative catalysts that may be used in this manner include ferrous ammonium sulfate plus hydrogen peroxide, guanidine hydrochloride plus ammonium persulfate, ethanol amine plus ammonium persulfate, silver ion plus persulfate, dimethyl aniline plus benzoyl peroxide, persulfuric acid (bound to anion exchange sites), and many others. In each case the second catalyst component is subsequently added, with the monomer or otherwise, as will be subsequently described. If a cellulosic host material is treated with ferric ion, an ion-exchange reaction results which causes the ferric ion to be chemically bound. The ferric ion, however, is relatively ineffective as a catalyst component and can be reduced in situ to ferrous ion and the resulting product used in the same manner as if the host material had been originally treated with ferrous ion. Similarly, when silver ion is fixed by ion-exchange reaction in a cellulosic material, the silver may be reduced to metallic form and is catalytically active in that form.

In chemically fixing the catalyst in the cellulosic host material by ion exchange reaction, reaction conditions are used which are known to those skilled in the art to be satisfactory for effecting ion exchange. The conditions of pH, cation or anion source, concentration, and the like, at which ion exchange will proceed between the ion-exchange groups in the cellulosic material and the ions in the polymerization catalyst in solution vary greatly with the particular starting or host material and the particular ion source employed. The general conditions for producing ion exchange are well known in the art. The particular conditions required for particular reagents and particular host materials can be developed from available knowledge by any person skilled in the art. The ion-exchange capacity of various cellulosic materials is available from a number of literature sources and can be determined for any specific material by simple well-known experimental techniques. Among other sources, one determining the necessary conditions for ion exchange in a particular situation may consult the principles set forth in Ion Exchange Resins, Kunin and Meyers, Wiley, New York, 1951, or Ion Exchange, Helfferich, McGraw-Hill, 1962.

Monomers used in accordance with this invention

The classes of monomers that can be used with the process of this invention include olefinically unsaturated monomers having hydrolyzable functional groups. These monomers are primarily vinyl and acrylic monomers and derivatives thereof. The functional groups on the monomers include acylamides, acylhalides, nitriles, esters, halides, and carboxylate salts. Some of the specific monomers that may be used in accordance with this invention include, but are not limited to, the following: methyl methacrylate, methyl acrylate, ethyl acrylate, butyl acrylate, allyl acrylate, acrylonitrile, acrylamide, acrylyl chloride, vinyl chloride, vinyl acetate, vinylidine chloride, vinylidine cyanide, p-chloro styrene, maleic anhydride, maleimide, fumaramide, etc.

Mixtures of such monomers may also be employed, in many such cases resulting in formation and deposition of copolymers. Furthermore, such monomers may be employed in admixture with other olefinically unsaturated monomers, such as styrene, butadiene, etc., which are readily polymerized but do not contain hydrolyzable functional groups.

General reaction conditions for polymer deposition

The conditions generally followed in the deposition of polymers in cellulosic materials are those described in the several co-pending patent applications of Douglas J. Bridgeford, referred to above.

While water is the cheapest solvent or dispersion medium for the ion exchange and polymer deposition steps of this process, other solvents and mixtures of solvents, such as alcohols, dioxane, acetone, tetrahydrofuran, etc., may be used. As a matter of fact, if desired, the solvent may be omitted entirely from the polymerization reaction and that reaction carried out using pure monomer. The polymer deposition may be carried out under air, nitrogen, an inert gas, a volatile monomer itself, or under steam from the refluxing solution as the blanketing atmosphere. The deposition may be carried out at room temperature or at reduced or elevated temperatures and at atmospheric pressure or subatmospheric or superatmospheric pressures. The various reagents employed in this process, such as the polymerization catalyst or the monomer to be polymerized, can be introduced into the host material by spraying, printing, doctoring, or other methods well known in the art, in addition to the steeping. The rate of the polymerization reaction in the method of this invention may be increased by the use of any of various catalyst promoters, such as cupric ion, dextrose, etc., which are well known in the art.

The method of this invention may be carried out even in the presence of a quantity of polymerization inhibitor, if the inhibitor is part of the catalyst system employed or is neutralized by excess catalyst present. An inhibitor may be naturally present, for example, in the material derived from wood which is used as the cellulosic starting material. The inhibitor may be a dye or resin, particularly of a quinone type. In some instances it may be necessary to remove the inhibitor for employing the monomer in this process.

Hydrolysis of cellulosic host containing deposited polymer

When a cellulosic host material is first treated with a solution of a catalyst component to fix the catalyst component by ion-exchange reaction and subsequently treated with an olefinically unsaturated monomer containing hydrolyzable functional groups and containing the remainder, if any, of the catalyst required to interact with the catalyst chemically fixed in the host, a polymerization takes place with the result that polymer is deposited within and upon the cellulosic material in an amount ranging from as low as a fraction of one percent to a much as several hundred percent of the weight of the cellulosic host material. When the resulting polymer-containing material is subjected to hydrolysis, a product is obtained having unique properties which will be described more fully in connection with specific applications of certain of the hydrolysis products. The polymer-containing cellulosic material is subjected to hydrolysis using an aqueous solution of a base (the aqueous solution may contain minor or major proportions of other solvents.

such as alcohols and the like). While the hydrolysis conditions are not critical from the standpoint of overall operability of the process, it is preferred to carry out the hydrolysis using a 2–10 percent slurry of polymer-containing cellulosic material in water containing a base, such as sodium hydroxide, lithium hydroxide, potassium hydroxide, tetramethylammonium hydroxide, etc., in an amount equal to about 20–120 percent wt. of the polymer-containing material being treated. The temperature and time required for the hydrolysis reaction are not critical and may vary over wide ranges. At lower temperatures, long reaction times are required. At 95° C. a reaction time of about one hour is sufficient. Reaction times ranging from thirty minutes to four hours or more have been employed, but one hour seems to be adequate at the aforementioned temperature. Under these reaction conditions, it is possible to hydrolyze up to about 95 percent of the hydrolyzable functional groups in the deposited polymer. By appropriate variation of the hydrolysis reaction conditions, the product obtained may contain from as low as 5 percent up to about 95 percent hydrolyzed functional groups.

The product containing partially hydrolyzed polymer is especially useful as a wet and dry strength additive for paper pulps. This product can also be used to reduce or supplant beating requirements for paper pulps. In some cases, superior results are obtained by acidifying the partially hydrolyzed polymer-containing product to convert the hydrolyzed functional groups to the acid or alcohol forms. Where the hydrolyzed polymer-containing material is used in admixture with paper pulp, a substantially greater improvement of paper strength is obtained by acidification of the mixture of the pulp and polymer-containing material than is achieved by acidification of the components separately.

The following non-limiting examples are illustrative of the scope of this invention:

EXAMPLE 1

One hundred parts of bleached aspen sulfite wood pulp were slurried at 0.8% consistency in water containing 0.7% ferrous ammonium sulfate in solution. The steeping was carried out at room temperature for a period of five minutes which was adequate to effect a substantially complete exchange of ferrous ion with the ion-exchange groups in the wood pulp. After steeping for five minutes, the pulp was filtered and rinsed with distilled water. The washed pulp was then re-slurried at 0.8% consistency into distilled water containing 1,000 parts of ethylacrylate monomer and 0.015% hydrogen peroxide. The mixture was maintained at a temperature of 90–92° C. for twenty minutes. At the end of this reaction time, the treated pulp was filtered, washed, and dried. The pulp was found to have increased in weight by 100% due to deposition of polyethylacrylate.

When the wood pulp containing polyethylacrylate is treated with aqueous potassium hydroxide, from 5 to 95% of the carboxylate groups are hydrolyzed to produce a product which is useful as a wet and dry strength additive for preparation of paper.

EXAMPLE 2

In another experiment, 100 parts of bleached aspen sulfite wood pulp were slurried at 0.5% consistency in water containing 0.7% ferrous ammonium sulfate in solution. After five minutes, the pulp was filtered from solution and rinsed with distilled water. The filtered and washed pulp was then re-slurried at 0.5% consistency into distilled water containing 200 parts of ethylacrylate monomer and 0.015% hydrogen peroxide. The mixture was held at a temperature of 90–92° C. for fifteen minutes. At the end of this reaction time, the pulp was filtered, washed, and dried. The treated pulp was found to have increased in weight by 67%, representing the amount of polyethylacrylate deposited within the pulp.

EXAMPLE 3

In a number of additional experiments, various polymers were deposited into wood fibers following the general procedures used in Examples 1 and 2. The reaction conditions and results of these experiments are set forth in Table I below. In the footnotes to Table I, the particular cellulosic materials treated and the catalyst systems used in the individual experiments are set forth in detail.

TABLE I

| I | II | III | IV | V | VI | VII | VIII | IX |
|---|---|---|---|---|---|---|---|---|
| Run No. | Cellulosic Material Treated | Catalyst System | Monomer | Consistency of Polymerization Slurry, Percent Pulp | Monomer/ Pulp, Wt./Ratio | Temp., °C. | Reaction Time, Minutes | Percent Polymer Addon |
| 1 | (1) | (1) | Ethyl acrylate | 1.0 | 1:1 | 90 | 10 | 45 |
| 2 | (1) | (1) | Vinyl acetate | 0.5 | 5:1 | 87 | 45 | 40 |
| 3 | (1) | (1) | 2-diethyl amino methyl methacrylate | 0.5 | 10:1 | 95 | 15 | 15 |
| 4 | (1) | (1) | Vinyl acetate | 5.0 | 10:1 | 67 | 30 | 200 |
| 5 | (1) | (1) | Butyl acrylate | 0.5 | 5:1 | 94 | 15 | 130 |
| 6 | (2) | (1) | Ethyl acrylate | 0.5 | 5:1 | 95 | 5–15 | 17–78 |
| 7 | (3) | (2) | Vinyl acetate | 2.0 | 1:1 | 95 | 30–45 | 30–60 |
| 8 | (3) | (1) | Methyl methacrylate | 2.0 | 5:1 | 92 | 5–15 | 50–90 |
| 9 | (2) | (1) | Acrylamide | 2.0 | 2:1 | 95 | 30 | 13 |
| 10 | (3) | (3) | Vinyl acetate | 2.0 | 1:1 | 100 | 30 | 12 |
| 11 | (2) | (1) | 2-ethylhexyl acrylate plus vinyl acetate | 2.0 | 1:1 | 75 | 30 | 11 |
| 12 | (2) | (2) | Vinyl acetate | 2.0 | 1.5:1 | 100 | 30 | 78 |
| 13 | (3) | (1) | Vinyl acetate plus methyl methacrylate | 2.0 | 1:1 | 95 | 30 | 67 |
| 14 | (3) | (1) | Styrene | 2.0 | 0.8:1 | 95 | 15 | 40 |
| 15 | (3) | (1) | Vinyl acetate-styrene-methyl methacrylate | 2.0 | 1:1 | 95 | 30–60 | 11–31 |
| 16 | (3) | (4) | Vinyl acetate | 3.0 | 1:1 | 100 | 30 | 44 |
| 17 | (1) and (3) | (2) | Vinyl acetate-vinylidene chloride | 0.6 | 1:1 | 50 | 240 | 54 |
| 18 | (1) and (3) | (2) | Vinyl acetate-methyl methacrylate | 6.0 | 1:1 | 95 | 240 | 76 |
| 19 | (1) and (3) | (2) | Vinyl acetate acrylonitrile | 6.0 | 2:1 | 50 | 120 | 18 |
| 20 | (1) and (3) | (2) | Acrylonitrile | 5.0 | 1:1 | 50 | 120 | 35 |
| 21 | (1) and (3) | (2) | Vinyl acetate-ethyl acrylate | 6.0 | 1:1 | 65 | 80 | 55 |
| 22 | (1) and (3) | (2) | 2-ethyl hexyl acrylate | 5.0 | 1:1 | 80 | 60 | 86 |
| 23 | (4) | (1) | Vinyl acetate | 2.0 | 1:1 | 100 | 75 | 15 |
| 24 | (3) | (1) | Acrylonitrile | 5.0 | 1:1 | 85 | 90 | 68 |
| 25 | (3) | (1) | ....do | 2.1 | 1:1 | 85 | 80 | 109 |
| 26 | (3) | (1) | Acrylonitrile plus ethyl acrylate | 5.0 | 1:1 | 75 | 90 | 75 |
| 27 | (3) | (1) | Acrylonitrile plus butyl acrylate | 5.0 | 1:1 | 75 | 90 | 62 |
| 28 | (3) | (1) | 2-ethyl hexyl acrylate | 5.0 | 1:1 | 75 | 90 | 75 |
| 29 | (3) | (1) | Methyl acrylate | 5.0 | 1:1 | 95 | 75 | 88 |
| 30 | (3) | (1) | Acrylonitrile | 10.0 | 1:1 | 82 | 50 | 58 |
| 31 | (3) | (5) | Acrylonitrile plus butadiene | 9.0 | 1:1 | [1] 43 | 90 | 90 |
| 32 | (3) | (1) | 90/10 methyl acrylate-methyl methacrylate | 6.5 | 1:1 | 57–58 | 100 | 280 |
| 33 | (3) | (2) | Styrene | 6.5 | 3:1 | 40–90 | 120 | 100 |
| 34 | (5) | (2) | Acrylonitrile | 4.0 | 1:1 | 60–90 | 20 | 16 |

[1] At 65 p.s.i.

Cellulosic material treated: (1) Bleached aspen sulfite pulp, (2) soft wood sulfate pulp, (3) soft wood kraft pulp, (4) hemicellulose, and (5) product of a run substantially the same as Run 24 after hydrolysis and extraction with hot water.

Catalyst system: (1) $Fe^{++}$ deposited in pulp by ion exchange using $Fe(NH_4)_2(SO_4)_2$ plus dilute (e.g. 0.03%) $H_2O_2$ in monomer solution, (2) same as (1) but $Fe^{++}$ deposited using 0.015% solution of $Fe(NH_4)_2(SO_4)_2$ without washing, (3) same as (1) but 0.03% potassium persulfate substituted for $H_2O_2$ in monomer solution, (4) same as (1) but 0.3% cumene hydroperoxide and 0.3% formaldehyde in monomer substituted for $H_2O_2$, and (5) $Fe^{++}$ deposited in pulp by ion exchange plus 0.09% $K_2S_2O_8$ and 0.045% $Na_2S_2O_4$ in monomer solution.

In each of the runs reported in the table, the wood pulp with polymer deposited thereon yields a product which is particularly useful as a wet and dry strength additive to paper pulps when subjected to hydrolysis with an aqueous base (with the obvious exception of Runs 14 and 33 in which the deposited polymer contains no hydrolyzable functional group) using the procedures described in the following examples.

EXAMPLE 4

Amino groups are introduced into softwood pulp by steeping in aqueous 2-chloroethylamine hydrochloride, blotting, and placing in 50% sodium hydroxide solution at 100° C. for five minutes, according to the procedure of Guthrie, J. D., Textile Research J., 17, 625 (1947). The pulp is then washed with deionized water until neutral and has an ion-exchange capacity of about 0.15 meq./g. The amino substituted pulp is then steeped in 1% persulfuric acid for two minutes and washed free of excess uncombined persulfate at room temperature. A solution of 400 ml. water containing 20 ml. of methylmethacrylate and 0.3 g. of sodium bisulfate treated pulp is then added and the mixture heated in air at 60° C. for fifteen minutes. Under these reaction conditions, polymethylmethacrylate is deposited in the pulp in an amount equal to about 65% wt. based on the pulp. When the polymer-containing pulp is treated with aqueous base, a substantial proportion of the deposited polymer is hydrolyzed to produce a product which is highly effective as a wet and dry strength additive for paper compositions.

EXAMPLE 5

A softwood pulp is steeped in 0.05 N cupric acetate at 25° C. for five minutes. The excess uncombined copper ion is washed out and the pulp then steeped in a 0.05 N solution of sodium hydrosulfite for two minutes. The pulp is then washed in warm water to remove excess reagent and immersed in a solution containing 20 ml. of methylmethacrylate and 1 g. of ammonium persulfate in 400 ml. of water. The mixture is maintained at 25° C. for fifteen minutes and the pulp is then removed and dried. This procedure is effective to deposit about 50% wt. of polymethylmethacrylate in the pulp. As in the previous examples, the hydrolysis of functional groups in the deposited polymer produces a composition having superior properties as a wet and dry strength additive for paper.

EXAMPLE 6

A softwood pulp is steeped in 0.01 N silver nitrate for five minutes and then washed free of uncombined silver and immersed in 0.1% hydrazine hydrate in water for an additional five minutes. This treatment is effective to precipitate metallic silver within the pulp. The pulp is then washed and placed in the same monomer system as in Example 5 and left to stand for fifteen minutes. This procedure results in the deposition of about 3–5% wt. of polymethylmethacrylate in the pulp.

EXAMPLE 7

A softwood pulp is steeped in a 0.5 N nitric acid containing 0.1% ammonium hexanitrato cerate for thirty minutes and then washed with distilled water. The ceric-treated pulp is then placed in distilled water containing 1% acrylonitrile and 0.03% hydrogen peroxide. The mixture is left at 25° C. under a nitrogen atmosphere for sixteen hours and the pulp then washed and dried. This procedure is effective to cause the deposition of about 50% wt. polyacrylonitrile in the pulp.

EXAMPLE 8

A softwood pulp is treated with a 0.01% Fe content aqueous solution of ferric chloride and washed with deionized water to remove unreacted iron. The pulp is then placed in a 5% solution of hydrazine hydrate to convert the bound ferric ion to ferrous ion. The pulp is again washed with distilled water and contacted with a solution containing 10 g. acrylonitrile and 0.03% hydrogen peroxide at 100° C. This procedure is effective to deposit polyacrylonitrile within the pulp in an amount equal to about 50% wt. based on the pulp. As in the previous examples, the treatment of the polymer-containing pulp with aqueous base is effective to partially hydrolyze the functional groups in the polymer and produce a product which is useful as a wet and dry strength additive for paper.

EXAMPLE 9

Pulp fibers containing 54% polyvinyl acetate, produced in accordance with Example 3, were processed on a laboratory paper machine to produce a 90 lb./ream sheet of paper. When this paper was subjected to heat and pressure to fuse the deposited polymer, the resulting product was found to have high gloss and was very resistant to grease. This process has been used in the formation of polyvinyl acetate-containing fibers into grease resistant top liner for cylinder board.

EXAMPLE 10

A blend of equal amounts of aspen sulfite and spruce sulfate pulps was reacted with vinyl acetate following the procedure described in Example 3 to produce an intra-fiber polymer containing 54% polyvinyl acetate. The polymer-containing pulp was beaten for five minutes in a Noble-wood cycle beater which reduced the Canadian freeness of the pulp from 800 to 425 ml. This pulp was diluted to a 0.6% consistency and formed into a 90 lb./ream sheet without difficulty on a laboratory paper machine.

In some cases, polymer clumps or beads formed outside of the wood pulp fibers. Conditions for minimizing external polymerization were determined by varying catalyst (concentration of iron in catalyst treating solution) and vinyl acetate concentrations and reaction temperatures. It was found that higher reaction temperatures, e.g. 70–110° C., low catalyst concentration, and higher monomer concentration result in intra-fiber grafting with a minimum formation of external polymer.

EXAMPLE 11

A softwood pulp was treated with dilute ferrous ammonium sulfate as in Example 3, washed, and contacted with an aqueous solution of ethyl acrylate containing 0.03% hydrogen peroxide. The resulting product contained about 58% wt. polyethylacrylate. This product was mixed at 5 and 10% concentrations with untreated pulp fibers and formed into paper sheets which had a cloth-like feel. This paper is useful for napkins and facial and toilet tissue. A similar effect is obtained when butylacrylate is polymerized within wood pulp and used as an additive to paper pulp composition. Tests which were carried out at different concentrations of pulp and polymer indicate that superior softness was obtained at moderate polymer concentrations, e.g. 20–40% wt. on treated pulp and concentrations of about 5–25% of treated pulp in the paper furnish.

EXAMPLE 12

A softwood pulp was treated with dilute ferrous ammonium sulfate as in Example 3 and with a solution of acrylonitrile containing 0.03% hydrogen peroxide. Polyacrylonitrile was deposited in the pulp in an amount equal to 33% of the weight of the pulp. Ten grams of the treated pulp containing 25% polyacrylonitrile were mixed with 600 ml. of 1% NaOH and heated at 100° C. for periods ranging from ten to forty-five minutes. This procedure resulted in the hydrolysis of 10–90% of the acrylonitrile and produced a gelatinous product.

A paper furnish was prepared by mixing one part of hydrolyzed polymer-containing pulp with three parts of untreated softwood pulp and formed into a hand sheet. The hand sheet was evaluated for bursting strength (Mullen Test) and found to have a bursting strength 43% greater than a control paper containing no polymer.

EXAMPLE 13

An aspen sulfite pulp was prepared and treated as in Example 3 to produce a 26% wt. content of polyacrylonitrile. The polymer-containing pulp was then treated with 1% sodium hydroxide solution for six hours at about 100° C. A slurry containing ten parts of the saponified fiber containing fibers was acidified to pH 3.5 and mixed with ninety parts of unbeaten, bleached aspen sulfite pulp. The mixture was placed in a Valley beater, and samples for making hand sheets were removed at various time intervals during the beating operation. A similar study was conducted where only the untreated pulp was beaten before adding 10% hydrolyzed polymer-containing fibers. In the latter study the slurry of mixed fibers was acidified to pH 3.5 before preparing the hand sheets. At beating times up to about ten minutes there was a very substantial increase in burst (Mullen Test) strength and tear strength of the paper formed from both experiments. It was also found that the burst and tear strengths were substantially increased over the values obtained for a control paper containing no deposited polymer. A control paper containing no resin and prepared from unbeaten pulp was evaluated for burst and tear strengths and found to have a Mullen bursting strength of 12 pts. and a tear strength of 90 g./100 lb. sheet. A paper containing 10% polymer-containing fiber which had been saponified and acidified as above described and which was beaten for fifteen minutes was prepared into a paper which had a Mullen burst strength of 93 pts. and a tear strength of 133 g./100 lbs. sheet.

From these and other experiments, we have found that the addition of hydrolyzed (and preferably further acidified) polymer-containing fibers to various pulps results in an increase of burst, tear, and/or tensile strength of paper made therefrom, improves pulp drainage rates, and reduces the beating requirements. We have found that the use of the hydrolyzed polymer-containing fibers can supplant beating of pulps to make papers of high tear strength. We have also found that the improvement in strength of papers prepared in this manner is of a magnitude such that it is possible to make good quality paper from low cost hardwood pulps which otherwise produce papers of very low strength. In general, the fibers containing hydrolyzed polymers produce superior reinforcement in paper when acidified than when used in the alkaline salt form.

A number of experiments were carried out in which various wood pulps were treated with ferrous ammonium sulfate solution to deposit a catalyst therein and then treated with a solution of acrylonitrile to deposit polyacrylonitrile within the pulp. The polymer-containing pulp was subjected to hydrolysis or saponification with aqueous base (NaOH) at about 100° C. for several hours. As noted above, the acidification of the partially hydrolyzed polymer-containing pulp results in a product which has superior properties as a wet and dry strength additive for paper. In a series of experiments carried out with partially hydrolyzed polymer-containing pulp, it was found that the acidification of a mixture of untreated and polymer-containing pulp (which had been hydrolyzed with aqueous base) prior to fabrication as a paper product resulted in a much greater strength than was obtained when the untreated pulp and hydrolyzed polymer-containing pulp were separately acidified. In general, it has been found that the acidification of mixtures of partially hydrolyzed polymer-containing pulp and untreated pulp results in bursting strength and tearing strength in the resulting paper which is 10–20% higher than when the partially hydrolyzed polymer-containing pulp is acidified prior to admixture with the untreated pulp.

EXAMPLE 14

A series of experiments were carried out in which the effect of various process variables was evaluated in the preparation of polymer-containing pulps for use as paper additives. Canadian softwood kraft fibers containing 40% polyacrylonitrile were hydrolyzed in solutions containing 1, 5, 10, and 15% sodium hydroxide. The saponified or hydrolyzed products were then mixed at 10% concentration in Canadian softwood kraft pulp that was slushed five minutes in a Valley beater and then formed into paper sheets. There was a very substantial increase in tear strength and Mullen burst strength for the resulting paper in each instance as compared to a control which had no polymer-containing pulp present therein. The maximum increase in tear strength and Mullen burst strength occurred for the pulps which were saponified or hydrolyzed using 5% or 10% sodium hydroxide. There was a slight decrease in tear and burst strengths for pulps which were hydrolyzed using 15% sodium hydroxide although even those pulps were capable of imparting a very substantial increase in tear and burst strengths to paper. The optimum alkali concentration for hydrolysis or saponification of polymer-containing pulp appears to be in the range from 5 to 15% alkali and is preferably at a concentration of 8 to 10%. In general, it was found that the saponification of Canadian softwood kraft pulp containing 40% polyacrylonitrile with 10% aqueous sodium hydroxide results in a maximum reinforcing effect when compounded with unbeaten kraft pulps.

Additional experiments were carried out in which the conditions for saponification or hydrolysis of the deposited polymer were evaluated. Several batches of pulp containing 40% polyacrylonitrile were prepared as described in the several previous examples. One portion of the polymer-containing pulp was hydrolyzed or saponified by heating in 10% sodium hydroxide solution at a pulp consistency of 2%. Another batch was saponified by heating in aqueous sodium hydroxide at about 10% concentration at a pulp consistency of 10%. The two batches were heated at about 100° C. for one hour and then were used in the formulation of paper in admixture with untreated pulp in a concentration of 5%. The pulp which had been hydrolyzed at a 10% slurry concentration produced an increase of 96 g. in tear strength and 10 pts. in Mullen burst strength. The pulp which had been hydrolyzed or saponified at a 2% slurry concentration produced an increase of 130 g. in tear strength and 14 pts. Mullen burst strength, as compared to a control containing no polymer (tear—177 g.; Mullen burst strength 14 pts.).

Several additional experiments were carried out in which the physical condition of the pulp prior to polymer deposition was evaluated. It was found that when polyacrylonitrile was deposited into highly beaten Canadian softwood kraft pulp, using the procedures described in the several examples above, a higher contribution to paper strength was obtained when the treated pulp was used in the manufacture of paper than was obtained with unbeaten pulps having polymers deposited therein.

EXAMPLE 15

In the formulation of various paper compositions using hydrolyzed polymer-containing pulps, it was found that these treated pulps have superior properties as adhesives, dispersing agents, and coating agents for paper. The adhesive properties of hydrolyzed polymer-containing pulps together with the ability of these pulps to disperse mineral pigments and accept basic dyes have made these pulps especially useful as coating materials and carriers for dyes and pigments in preparing colored paper compositions. In one case, a 5% paste of a fiber containing 40% polyacrylonitrile which had been hydrolyzed by heating in 10% aqueous sodium hydroxide and acidified was colored by addition of a methylene blue dye and applied to paper board with a laboratory trailing blade coater. A very novel decorative effect was produced where the individual fibers made separate blue streaks on the paper surface. The polymer-containing pulp can be dyed using any dye or pigment which will color the polymer or which will be suspended and dispersed in the polymer-containing pulp composition. When the colored pulp is used in the formation of paper or in the coating of preformed paper, novel color effects are obtained.

EXAMPLE 16

When a paper is prepared which has incorporated therein a substantial proportion of a pulp containing partially hydrolyzed and acidified polymer, the acid functional groups in the deposited polymer provide chemical sites for reaction with and retention of other resins which may be added to provide increased wet and dry strength where such resins have basic functional groups. Thus, when a wet strength resin such as a polystyrene type resin containing amino functional groups or a polyamide (e.g. nylon) type resin is added to a paper containing a partially hydrolyzed and acidified deposited polymer, the added resin is retained by chemical reaction between its basic functional groups and the acid functional groups in the deposited polymer.

EXAMPLE 17

In still another series of experiments, attempts were made to increase the efficiency of the deposition of polymer in various wood pulps. A 9.1% slurry of Canadian softwood kraft pulp was treated with hydrogen peroxide for one hour at 60° C. After washing and squeezing out excess water from the oxidized pulp, it was placed in a reactor with a dilute solution (0.01%) of ferrous ammonium sulfate which resulted in the chemical fixation of ferrous ions at acidic ion-exchange sites in the pulp. Acrylonitrile was added to the solution together with a small amount of hydrogen peroxide and the mixture heated at 60–88° C. for one hour. Under these conditions, 95% of the acrylonitrile was converted to intra-fiber polymer. This conversion represented an increase in efficiency of about 25–35% over the best results previously obtained. A product containing 49% polyacrylonitrile was formed in this very fast and unusually complete reaction. When saponified or hydrolyzed in hot 10% aqueous sodium hydroxide and added to Canadian softwood kraft pulp at a 5% concentration, the bursting strength of the resulting paper was 160% greater than a control (having Mullen burst strength of 46 pts.) containing no polymer. Similar polymer-containing pulps have been prepared by oxidation of the pulp using various bleaching agents, e.g. calcium hypochloride, sodium peroxide, chlorine dioxide, etc., prior to treatment with the catalyst and monomer which is to be polymerized within the pulp. When polymer-containing pulps have been prepared in this manner and hydrolyzed or saponified in hot aqueous sodium hydroxide and added to wood pulps, increases in paper bursting strength have been obtained ranging from 50–160%.

EXAMPLE 18

When polymer-containing pulp prepared in accordance with any of the previous examples is subjected to heat and pressure, the pulp is formed into boards, sheets, containers, and the like with great ease. When polymer-containing pulp is heated and compressed between flat platens, boards or sheets are formed according to the amount of pulp treated and the temperature and pressure used. When the polymer-containing pulp is used in a suitable mold and subjected to heat and pressure, molded objects are obtained in which the paper pulp is bound together by the fused deposited polymer. While the molding and forming of the products of this invention that are primarily useful with the polymer-containing pulp per se, it is also possible to mold and form mixtures of untreated pulp and the polymer-containing pulp. In general, for molding or forming it is desirable that the mixture of pulp contain 10% or more of the polymer-containing pulp product.

EXAMPLE 19

In Example 3, one experiment was reported in which a polymer was deposited within hemicellulose. In the several experiments in which polymer deposited pulps have been treated with aqueous base to hydrolyze or saponify the deposited polymer, there has been noted a complete absence of hemicellulose in the alkaline solution. From these experiments, it has been concluded that the process of this invention is effective to render hemicellulose insoluble in alkali.

EXAMPLE 20

In another series of experiments, water-soluble polymeric material of undetermined composition were separated from partially hydrolyzed polymer-containing pulp. In one experiment, a beaten Canadian softwood kraft pulp was treated with catalyst and with acrylonitrile to produce a polymer-containing pulp containing 39% wt. polyacrylonitrile. A 2% slurry of the pulp in 8% aqueous NaOH was heated for sixty minutes at 98° C. Twenty grams of this polymer-containing pulp were slurried in 10 liters of water and allowed to stand overnight to let the fibers settle out. A clear serum was drained from the fibers and the process of diluting with 10 liters of water, settling overnight, and draining were repeated twice more. This procedure caused a 25% loss in weight of the polymer-containing fiber. The dilute aqueous extract was concentrated to solid form and used as an additive in the preparation of paper to determine the effect of the water-soluble constituents of the polymer-containing pulp. A paper was prepared using 95% Canadian softwood kraft pulp and 5% hydrolyzed polymer-containing pulp. This paper had a Mullen bursting strength of 104 as compared to a burst strength of 39 for a control paper. Another paper was prepared from untreated Canadian softwood kraft pulp and 1.25% of the serum resins obtained in the water extraction of the treated pulp described above. The concentration of these serum solids corresponded to the proportion of those solids present in the treated pulp in the aforementioned paper. The paper which was prepared using the serum resins had a Mullen burst strength of 83. From these measurements, it is seen that the serum resins (water-soluble resins produced in the pulp together with unknown water-soluble constituents in the pulp) are apparently responsible for about 65% of the increase in burst strength of the paper while constituting only 25% of the weight of the treated pulp.

In another experiment, Canadian softwood kraft pulp was treated with catalyst and acrylonitrile for a time sufficient to deposit 65% wt. polyacrylonitrile within the pulp. This treated pulp was then hydrolyzed under the conditions described above and washed with water to remove water-soluble constituents. In this experiment, the pulp which contained 65% wt. addon yielded only 10% water-soluble resins or serum resins. However, when 0.5% wt. of these serum resins was added to untreated Canadian softwood kraft pulp and paper formed therefrom, there was obtained a 60% increase in bursting strength for the paper as compared to an untreated control paper. From this experiment, it was found that the serum solids which made up only 10% of the treated pulp accounted for 63% of its total paper reinforcing effect.

EXAMPLE 21

In another series of experiments, it was found that hydrolyzed polymer-containing pulps are useful for conditioning clay soils to prevent puddling when wet and caking when dry. The soil stabilizing properties of hydrolyzed polymer-containing pulp were evaluated using the test method described by A. S. Michaels in Industrial and Engineering Chemistry, 46, 1485–1490 (1954). Wood pulp containing 40–50% polyacrylonitrile, prepared as described in the preceding examples, and saponified or hydrolyzed by treatment with 10% aqueous NaOH were very effective in reducing the density of clays. The addition of 0.10% wt. of the treated fiber in clay resulted in a reduction of 15–25% in density which is equal or superior to commercially available soil conditioners and is economically superior to soil conditioners presently available.

In another experiment, a soil conditioner containing essential nutrients for plant growth was prepared. An intra-fiber polymer consisting of wood pulp containing 25% polyacrylonitrile was saponified or hydrolyzed using potassium hydroxide. The saponified fiber was neutralized with phosphoric acid (to pH of about 7) to fix ammonia released during the saponification reaction, and urea was added to fortify the product with nitrogen. The product was dried and found to be effective as a combination soil conditioner and fertilizer.

While we have described our invention fully and completely and with special emphasis upon certain preferred embodiments as required by the patent laws, we wish it to be understood that within the scope of the appended claim this invention may be practiced otherwise than as specifically described herein.

What is claimed is:

1. A paper product consisting essentially of a major proportion of paper-making fibers and a minor proportion of wood fibers having a partially hydrolyzed polymer deposited therein, said polymer being formed by in situ polymerization of an olefinically unsaturated monomer containing hydrolyzable functional groups followed by hydrolysis of at least part of said hydrolyzable functional groups.

References Cited

UNITED STATES PATENTS

| | | | |
|---|---|---|---|
| 2,084,272 | 6/1937 | Auchterlonie | 162—168 |
| 2,315,675 | 4/1943 | Trommsdorff | 162—168 |
| 3,081,143 | 3/1963 | Segro et al. | 162—157 |
| 3,083,118 | 3/1963 | Bridgeford | 162—168 |
| 3,183,056 | 5/1965 | Pfeiffer et al. | 117—155 |
| 3,194,727 | 7/1965 | Adams et al. | 162—168 |
| 3,232,824 | 2/1966 | Bader | 162—183 |

S. LEON BASHORE, *Primary Examiner.*